(12) United States Patent
Zeng et al.

(10) Patent No.: US 11,987,674 B2
(45) Date of Patent: May 21, 2024

(54) METHOD FOR PREPARING ANISOTROPIC CELLULOSE-BASED HYDROGEL

(71) Applicant: XIAMEN UNIVERSITY, Fujian (CN)

(72) Inventors: Xianhai Zeng, Fujian (CN); Guihua Yan, Fujian (CN); Lu Lin, Fujian (CN); Yong Sun, Fujian (CN); Xing Tang, Fujian (CN)

(73) Assignee: XIAMEN UNIVERSITY, Fujian (CN)

( * ) Notice: Subject to any disclaimer, the term of this patent is extended or adjusted under 35 U.S.C. 154(b) by 0 days.

(21) Appl. No.: 18/236,549

(22) Filed: Aug. 22, 2023

(65) Prior Publication Data

US 2023/0407015 A1    Dec. 21, 2023

Related U.S. Application Data

(63) Continuation of application No. PCT/CN2021/085390, filed on Apr. 2, 2021.

(30) Foreign Application Priority Data

Feb. 22, 2021 (CN) .......................... 202110199510.6

(51) Int. Cl.
  *C08J 3/075* (2006.01)
  *C08B 15/06* (2006.01)
  *C08F 251/02* (2006.01)
(52) U.S. Cl.
  CPC .............. *C08J 3/075* (2013.01); *C08B 15/06* (2013.01); *C08F 251/02* (2013.01); *C08J 2351/02* (2013.01)

(58) Field of Classification Search
  None
  See application file for complete search history.

(56) References Cited

U.S. PATENT DOCUMENTS 10,734,642 B2 *   8/2020  Zhamu ................... H01M 4/62
2009/0252800 A1  10/2009  Wan et al.
2013/0011385 A1   1/2013  Li et al.

FOREIGN PATENT DOCUMENTS

| CN | 108359056 A | * | 8/2018 | ............ C08F 251/02 |
| CN | 108359056 A |   | 8/2018 | |
| CN | 109134914 A | * | 1/2019 | ............ C08F 251/02 |
| CN | 109134914 A |   | 1/2019 | |

(Continued)

OTHER PUBLICATIONS

Zhang et al., ChemistryOpen, 2018, 7, p. 885-889 (Year: 2018).*

(Continued)

*Primary Examiner* — Satya B Sastri
(74) *Attorney, Agent, or Firm* — Cooper Legal Group, LLC (57) ABSTRACT

A method for preparing anisotropic cellulose-based hydrogel is provided. The method comprises ammoniating the dialdehyde cellulose obtained by oxidizing cellulose using sodium periodate to obtain ammoniated cellulose derivatives; performing Schiff reaction using the ammoniated cellulose derivatives and dopamine to obtain cellulose-based nanosheets; depositing $Fe_3O_4$ nanoparticles on a surface of the cellulose-based nanosheets by a deposition method to obtain magnetic cellulose-based nanosheets; and forming the anisotropic cellulose-based hydrogel using the magnetic cellulose-based nanosheets by a polymerization method.

13 Claims, 4 Drawing Sheets

(56) References Cited

FOREIGN PATENT DOCUMENTS

| CN | 111423600 | A | * | 7/2020 | ............. | A61L 27/18 |
| CN | 111423600 | A | | 7/2020 | | |
| CN | 112029117 | A | | 12/2020 | | |
| CN | 112142993 | A | * | 12/2020 | ............. | C08F 220/56 |
| CN | 112266486 | A | | 1/2021 | | |

OTHER PUBLICATIONS

CN108359056 A, 2018, machine translation (Year: 2018).*
CN 112142993 A, 2020, Machine translation (Year: 2020).*
CN 111423600 A,, 2020, machine translation (Year: 2020).*
CN 109134914 A, 2019, Machine translation (Year: 2019).*
Corresponding International Patent Application No. PCT/CN2021/085390, International Search Report, date mailed Nov. 23, 2021.
Corresponding International Patent Application No. PCT/CN2021/085390, Written Opinion, date mailed Nov. 23, 2021.
Hosseinzadeh, Hossein, et al., "Fabrication and characterization of CMC-based magnetic superabsorbent hydrogel nanocomposites for crystal violet removal", Polymers for Advanced Technologies, Jun. 6, 2016, pp. 1609-1616, vol. 27, Issue 12.
Corresponding Chinese Patent Application No. 202110199510.6, First Office Action dated Oct. 11, 2021.
Corresponding Chinese Patent Application No. 202110199510.6, Notification to Grant Patent dated Dec. 29, 2021.
Ajay Kumar Gupta, et al., "Synthesis and surface engineering of iron oxide nanoparticles for biomedical applications", Biomaterials, 2005, No. 26, pp. 3995-4021.
Sonia García-Jimenoa, et al., "Ferrofluid based on polyethylene glycol-coated iron oxide nanoparticles: Characterization and properties", Colloids and Surfaces A: Physicochem. Eng. Aspects, 2103, No. 420, pp. 74-81.
Kezhi Liu, et al., "An Anisotropic Hydrogel Based on Mussel-Inspired Conductive Ferrofluid Composed of Electromagnetic Nanohybrids", Nano Lett. 2019, No. 19, pp. 8343-8356.

* cited by examiner

METHOD FOR PREPARING ANISOTROPIC CELLULOSE-BASED HYDROGEL

RELATED APPLICATIONS

This application is a continuation of International patent application PCT/CN2021/085390, filed on Apr. 2, 2021, which claims priority to Chinese patent application 202110199510.6, filed on Feb. 22, 2021. International patent application PCT/CN2021/085390 and Chinese patent application 202110199510.6 are incorporated herein by reference.

FIELD OF THE DISCLOSURE

The present disclosure relates to the field of natural polymeric materials, and in particular relates to a method for preparing anisotropic cellulose-based hydrogel.

BACKGROUND OF THE DISCLOSURE

Water-rich hydrogel soft structures are similar to biological systems and widely used in biomaterials, wearable devices, chemical engineering, and other fields. It is worth noting that biological tissues of an organism present a highly ordered composite structure for withstanding great external forces. Highly anisotropic Hydrogel is inspired by organisms and has received wide attention in an application of soft materials. However, in stark contrast, most synthetic hydrogels exhibit an isotropic structure due to disordered cross-linking of monomers. Therefore, it holds a great significance to obtain anisotropic hydrogel with good mechanical properties.

At present, materials with anisotropy are precisely regulated in nano to macro scales through directional lyophilization, self-assembly, magnetic field, and other external intervention methods. A method for preparing the anisotropic hydrogel using a magnetic field is a most simple and efficient method. Gupta, etc. (A. K. Gupta, M. Gupta, Biomaterials, 2005, 26, 3995-4021) points out that $Fe_3O_4$ nanoparticles can provide tunable electromagnetic fields to achieve a desired anisotropy, but the $Fe_3O_4$ nanoparticles easily accumulate in a precursor solution, resulting in high requirements for sizes of the $Fe_3O_4$ nanoparticles. The $Fe_3O_4$ nanoparticles loaded on a polymer surface have caused a problem of conductivity reduction (S. Garcia-Jimeno, J. Estelrich, Colloid. Surface. A. 2013, 420, 74-81). Moreover, most of the existing carriers are nanoparticles or nanowires, and an anisotropic structural strength of the hydrogel formed by the nanoparticles or the nanowires still needs to be improved. In view of the aforementioned challenges for preparing ferromagnetic fluid (for example, the $Fe_3O_4$ nanoparticles tend to aggregate, the $Fe_3O_4$ nanoparticles are large, and the $Fe_3O_4$ nanoparticles easily fall off of the carrier), it is necessary to seek an improved carrier to carry the $Fe_3O_4$ nanoparticles so as to form a stable ferromagnetic fluid to achieve excellent performance of functional materials. Cellulose oxidized by sodium periodate is a traditional method to modify the cellulose. Morphology of cellulose derivatives greatly changes due to different degrees of oxidation and different water-dissolving ways. When the cellulose is completely oxidized and dissolved in water, dialdehyde cellulose presents two-dimensional sheet morphology, a size of the dialdehyde cellulose is from a few hundred nanometers to a few micrometers, and the dialdehyde cellulose becomes an exploration target of a $Fe_3O_4$ nanoparticle carrier. However, in order to prevent the ferromagnetic fluid from aggregating in strong magnetic fields, leading to an insulation of most of the ferromagnetic fluid, causing having difficulty producing the hydrogel with anisotropic conductivity using traditional ferromagnetism.

Therefore, it is necessary to develop a conductive ferromagnetic fluid with a good interface between a polymer matrix and nanocomponents to achieve high anisotropy.

BRIEF SUMMARY OF THE DISCLOSURE

An objective of the present disclosure is to solve the deficiencies of the existing techniques. A cellulose modification method is used to enable cellulose to become a structure with a surface rich in phenol hydroxyl (i.e., cellulose based-nanosheets), so as to attract $Fe_3O_4$ nanoparticles to deposit on the surface of the structure to form magnetic cellulose-based nanosheets, and the $Fe_3O_4$ nanoparticles are fixed on a surface of the cellulose based-nanosheets to effectively prevent aggregation of the $Fe_3O_4$ nanoparticles. Compared with ordinary nanoparticles and nanowire carriers of the cellulose, a design of the cellulose-based nanosheets of the present disclosure enables covalent bonds formed by gel polymerization to be more firm, so that multiple advantages such as anisotropy, high strength, electrical conductivity, and adhesion performance of hydrogel are achieved.

The present disclosure provides a method for preparing anisotropic cellulose-based hydrogel, the method comprises the following steps:

A technical solution of the present disclosure is as follows:

A method for preparing anisotropic cellulose-based hydrogel comprises the following steps:
(1) obtaining dialdehyde cellulose by oxidizing cellulose using sodium periodate;
(2) ammoniating the dialdehyde cellulose to obtain ammoniated cellulose derivatives;
(3) performing Schiff reaction using the ammoniated cellulose derivatives and dopamine to obtain cellulose-based nanosheets;
(4) depositing $Fe_3O_4$ nanoparticles on a surface of the cellulose-based nanosheets by a deposition method to obtain magnetic cellulose-based nanosheets; and
(5) forming the anisotropic cellulose-based hydrogel using the magnetic cellulose-based nanosheets by a polymerization method.

In a preferred embodiment, the obtaining dialdehyde cellulose by oxidizing cellulose using sodium periodate in the step 1 comprises: mixing the cellulose and the sodium periodate in a water system, stirring while preventing light exposure, then washing in deionized water, and freeze-drying to obtain the dialdehyde cellulose; and heating the dialdehyde cellulose to be dissolved in water to obtain a dialdehyde cellulose aqueous solution.

In a preferred embodiment, the ammoniating the dialdehyde cellulose to obtain ammoniated cellulose derivatives in the step 2 comprises: mixing the dialdehyde cellulose obtained in the step 1 with $NH_3 \cdot H_2O$ and methanol, reacting in a reaction kettle while heating under catalyst and $H_2$ pressure to obtain the ammoniated cellulose derivatives, wherein the catalyst is selected from at least one of an iron-based catalyst, a cobalt-based catalyst, a nickel-based catalyst, an Ru/C catalyst, or a Pd/C catalyst.

In a preferred embodiment, in the step 2, the $H_2$ pressure is more than 2.0 MPa, a temperature for the reacting is 100-150° C., and a time for the reacting is more than 2 hours.

In a preferred embodiment, the performing Schiff reaction using the ammoniated cellulose derivatives and dopamine to obtain cellulose-based nanosheets in the step 3 comprises: adding the ammoniated cellulose derivatives obtained in the step 2 to a mixture of methanol and water, stirring, then adding the dopamine, and reacting to obtain a reaction solution; and adjusting pH of the reaction solution to be alkaline, further reacting, centrifuging, and drying to obtain the cellulose-based nanosheets.

In a preferred embodiment, the depositing $Fe_3O_4$ nanoparticles on a surface of the cellulose-based nanosheets by a deposition method to obtain magnetic cellulose-based nanosheets in the step 4 comprises: dispersing the cellulose-based nanosheets obtained in the step 3 into a mixture of water and methanol, stirring, then adding a mixture solution containing $FeCl_2 \cdot 4H_2O$ and $FeCl_3 \cdot 6H_2O$, stirring under $N_2$ atmosphere, then adding $NH_3 \cdot H_2O$, reacting while heating, centrifuging, and washing to obtain the magnetic cellulose-based nanosheets.

In a preferred embodiment, the depositing $Fe_3O_4$ nanoparticles on a surface of the cellulose-based nanosheets by a deposition method to obtain magnetic cellulose-based nanosheets in the step 4 comprises: dispersing 10 mg of the cellulose-based nanosheets obtained in the step 3 into 30 mL of a mixture of water and methanol, stirring for 30 minutes, then adding 20 mL of a mixture solution containing 3 mg of $FeCl_2 \cdot 4H_2O$ and 8 mg of $FeCl_3 \cdot 6H_2O$, stirring for 1 hour under $N_2$ atmosphere, then adding 0.1 mL of 28% $NH_3 \cdot H_2O$, reacting while heating, and repeatedly centrifuging and washing to obtain the magnetic cellulose-based nanosheets coated with the $Fe_3O_4$ nanoparticles, wherein a volume/volume (v/v) ratio of the water and the methanol is 2:1.

In a preferred embodiment, the forming hydrogel using the magnetic cellulose-based nanosheets by a polymerization method in the step 5 comprises: mixing tetramethylethylenediamine, allyl monomer, initiator, N,N-methylene diacrylamide, and the magnetic cellulose-based nanosheets obtained in the step 4, stirring, pouring into a mold, and performing the polymerization method to obtain the anisotropic cellulose-based hydrogel.

In a preferred embodiment, the allyl monomer is acrylamide or acrylic acid; and the initiator is ammonium persulfate or potassium persulfate.

In a preferred embodiment, the forming hydrogel using the magnetic cellulose-based nanosheets by a polymerization method in the step 5 further comprises: leaving the mold to stand at 60-70° C. for 1-3 hours.

In a preferred embodiment, in the step 2, the $H_2$ pressure is 2.0-3.0 MPa, a temperature for the reacting is 120° C., and a time for the reacting is 3-5 hours.

In a preferred embodiment, a volume/volume (v/v) ratio of the methanol and the water is 1:4, and the adjusting pH of the reaction solution to be alkaline comprises adjusting pH of the reaction solution to be 8.0-9.0.

In a preferred embodiment, a weight/volume ratio of cellulose-based nanosheets and the mixture of the water and the methanol is 1 mg: 2-4 mL, a volume/volume (v/v) ratio of the water and the methanol of the mixture is 1-3:1, a weight ratio of the $FeCl_2 \cdot 4H_2O$ and $FeCl_3 \cdot 6H_2O$ in the mixture solution is 3:5-12, the $NH_3 \cdot H_2O$ is 28% $NH_3 \cdot H_2O$, a temperature for the reacting while heating is 80-100° C., and a time for the reacting while heating is 1-5 hours.

The present disclosure has the following advantages.

The cellulose used in the present disclosure is cheap, readily available, and renewable biomass resources widely existing in nature, and a cost of raw materials is greatly reduced. The surface of the cellulose-based nanosheets prepared by the present disclosure comprises more highly active groups. Compared with ordinary nanoparticles and ordinary nanowire carriers of the cellulose, a design of the present disclosure enables covalent bonds formed by gel polymerization to be more firm. The hydrogel of the present disclosure has multiple advantages, such as anisotropy, high strength, electrical conductivity, adhesion performance, and extremely high development potential. Reaction conditions for obtaining the hydrogel are mild and generate low contamination.

BRIEF DESCRIPTION OF THE DRAWING

FIGS. 2A and 2B illustrate transmission electron microscope (TEM) images of magnetic cellulose-based nanosheets obtained in Embodiment 1.

FIG. 8 illustrates results of Embodiment 1, the tensile stress-strain test are performed by the conventional method.

DETAILED DESCRIPTION OF THE EMBODIMENTS

The technical solution of the present disclosure will be further described below in combination with the accompanying embodiments and drawings, and the scope of the present disclosure is not limited thereto.

Embodiment 1

The embodiment is performed in the following steps.
(1) 100 mL of a wood pulp cellulose suspension with a concentration of 0.55 wt %, 0.6 g of $NaIO_4$, and 2 mL of isopropyl alcohol are mixed in a conical bottle and reacted at 65° C. while preventing light exposure for 12 hours at a mixing speed of 500 revolutions per minutes (rpm). Dialdehyde cellulose is then obtained by centrifugation, washing in deionized water, and freeze-drying. The dialdehyde cellulose is added into a round-bottled flask containing 100 mL of deionized water and reacted at 100° C. for 2 hours at a stirring speed of 300 rpm. Dialdehyde cellulose aqueous solution is obtained by centrifugation and concentration, and a concentration of the dialdehyde cellulose aqueous solution is tested to be 3.3 g/10 g.
(2) The dialdehyde cellulose aqueous solution (10 g) obtained in the step 1 is centrifuged to remove water and then fully mixed with $NH_3 \cdot H_2O$ (6 mL) and methanol (30 mL) to obtain a first mixture. The first mixture is reacted in a 100 mL reactor under a Ru/C catalyst (0.1 g) and 2 MPa of $H_2$ pressure for 2 hours at 100° C. to obtain ammoniated cellulose derivatives.
(3) The ammoniated cellulose derivatives (5 mL) obtained in the step 2 are added into a mixture of methanol/water with a volume/volume (v/v) ratio of 1:4 and stirred for 1 hour, and dopamine (0.02 g) is then added and reacted for 2 hours at room temperature (e.g., 20-25° C.) to obtain a reaction solution. pH of the reaction solution is adjusted to 8.2 by NaOH. After the reaction solution is further reacted, centrifuged at 8000 rpm for 5 minutes, and dried at −50° C. for 48 hours to obtain cellulose-based nanosheets.
(4) 10 mg of the cellulose based nanosheets obtained in the step 3 are dispersed into 30 mL of water/methanol with a v/v ratio of 2:1 and stirred for 30 minutes to obtain a dispersing solution. 20 mL of a mixture solution containing 3 mg of $FeCl_2 \cdot 4H_2O$ and 8 mg of $FeCl_3 \cdot 6H_2O$ is added into the dispersing solution and stirred for 1 hour under $N_2$ atmosphere to obtain a second mixture. Then, 0.1 mL of 28% $NH_3 \cdot H_2O$ is added into the second mixture and reacted for 3 hours at 80° C., and centrifuged and washed repeatedly to obtain cellulose-based nanosheets (i.e., cellulose-dopamine nanosheets) coated with magnetic $Fe_3O_4$ nanoparticles.
(5) 2.6 g of acrylamide, 0.026 g of N,N-methylene diacrylamide, 15 μL of tetramethylethylenediamine, 0.03 g of ammonium persulfate, and 0.052 g of the cellulose based nanosheets coated with magnetic $Fe_3O_4$ nanoparticles (i.e., magnetic PFeDAC nanosheets or magnetic cellulose-dopamine nanosheets) prepared by the step 4 are mixed, stirred, and poured into a mold. The mold is then left to stand at 60° C. for 3 hours to be polymerized to obtain a cellulose-based hydrogel.

Longitudinal tensile strength of a directional hydrogel (i.e., the cellulose-based hydrogel or various hydrogels) prepared under these conditions is about 0.22 MPa, 1.7 times the longitudinal tensile strength of a random directional hydrogel. Conductivity of the directional hydrogel is 41 $S \cdot m^{-1}$, and an adhesion force of the directional hydrogel to the skin can reach 63 kPa. Material properties are tested using conventional methods (referring to K. Liu, L. Han, P. Tang, K. Yang, D. Gan, X. Wang, K. Wang, F. Ren, L. Fan, Y. Xu, Z. Lu, X. Lu, *Nano Lett.* 2019, 19, 8343-83).

Figure 4A:
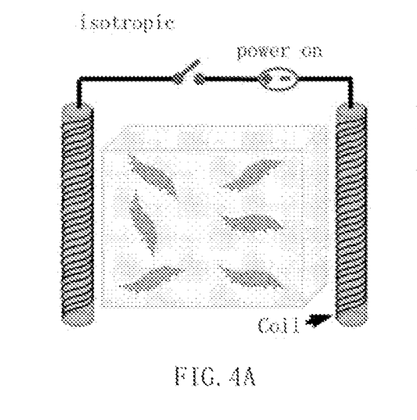
FIGS. 4A and 4B illustrate a principle for forming various hydrogels.
Figure 4B:
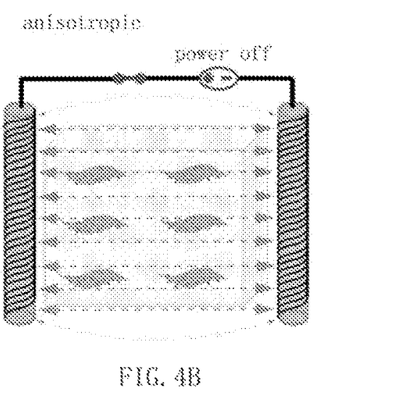

FIG. 4 illustrates a principle for forming a hydrogel. When power supply is not connected, the magnetic PFeDAC nanosheets are in disordered states. When the power supply is connected, the magnetic nanosheets are arranged in a direction of the magnetic field under an action of the magnetic field to form an ordered anisotropic structure.

Embodiment 2

Embodiment 2 is performed as follows.
(1) The dialdehyde cellulose aqueous solution is obtained according to the step of the Embodiment 1.
(2) An operation of step 2 in this embodiment is performed in accordance with the step 2 in Embodiment 1. The step 2 in this embodiment differs from the step 2 in Embodiment 1 in that the first mixture is reacted for 3 hours.
(3) An operation of step 3 in this embodiment is performed in accordance with the step 3 in Embodiment 1. The step 3 in this embodiment differs from the step 3 in Embodiment 1 in that 0.03 g of the dopamine is added, and pH of the reaction solution is adjusted to 8.2.
(4) An operation of step 4 in this embodiment is performed in accordance with the step 4 in Embodiment 1. The step 4 in this embodiment differs from the step 4 in Embodiment 1 in that 0.1 mL of 28% $NH_3 \cdot H_2O$ is added into the second mixture and reacted for 5 hours at 80° C.
(5) An operation of step 5 in this embodiment is performed in accordance with the step 5 in Embodiment 1. The step 5 in this embodiment differs from the step 5 in Embodiment 1 in that 0.026 g of magnetic hybrids (i.e., the cellulose based nanosheets coated with magnetic $Fe_3O_4$ nanoparticles) is added.

The longitudinal tensile strength of the directional hydrogel prepared under these conditions is about 0.19 MPa, 1.5 times the longitudinal tensile strength of the random directional hydrogel. Conductivity of the directional hydrogel is 37 $S \cdot m^{-1}$, and an adhesion force of the directional hydrogel to the skin can reach 54 kPa.

Embodiment 3

Embodiment 3 is performed as follows.
(1) The dialdehyde cellulose aqueous solution is obtained according to the step of the Embodiment 1.
(2) An operation of step 2 in this embodiment is performed in accordance with the step 2 in Embodiment 1.

The step 2 in this embodiment differs from the step 2 in Embodiment 1 in that the first mixture is reacted in 3 MPa of the $H_2$ pressure.
(3) An operation of step 3 in this embodiment is performed in accordance with the step 3 in Embodiment 1. The step 3 in this embodiment differs from the step 3 in Embodiment 1 in that 0.03 g of the dopamine is added, and pH of the reaction solution is adjusted to 8.5.
(4) An operation of step 4 in this embodiment is performed in accordance with the step 4 in Embodiment 1. The step 4 in this embodiment differs from the step 4 in Embodiment 1 in that 0.1 mL of 28% $NH_3 \cdot H_2O$ is added into the second mixture and reacted for 1 hour at 90° C.
(5) An operation of step 5 in this embodiment is performed in accordance with the step 5 in Embodiment 1. The step 5 in this embodiment differs from the step 5 in Embodiment 1 in that 0.1 g of magnetic hybrids (i.e., the cellulose based nanosheets coated with magnetic $Fe_3O_4$ nanoparticles) is added.

The longitudinal tensile strength of the directional hydrogel prepared under these conditions is about 0.3 MPa, 2.3 times the longitudinal tensile strength of the random directional hydrogel. Conductivity of the directional hydrogel is 45 $S \cdot m^{-1}$, and an adhesion force of the directional hydrogel to the skin can reach 66 kPa.

Embodiment 4

Embodiment 4 is performed as follows.
(1) The dialdehyde cellulose aqueous solution is obtained according to the step of the Embodiment 1.
(2) An operation of step 2 in this embodiment is performed in accordance with the step 2 in Embodiment 1. The step 2 in this embodiment differs from the step 2 in Embodiment 1 in that the first mixture is reacted at 110° C.
(3) An operation of step 3 in this embodiment is performed in accordance with the step 3 in Embodiment 1. The step 3 in this embodiment differs from the step 3 in Embodiment 1 in that pH of the reaction solution is adjusted to 9.0.
(4) An operation of step 4 in this embodiment is performed in accordance with the step 4 in Embodiment 1. The step 4 in this embodiment differs from the step 4 in Embodiment 1 in that 0.1 mL of 28% $NH_3 \cdot H_2O$ is added into the second mixture and reacted for 3 hours at 80° C.
(5) An operation of step 5 in this embodiment is performed in accordance with the step 5 in Embodiment 1.

The longitudinal tensile strength of the directional hydrogel prepared under these conditions is about 0.2 MPa, 1.5 times the longitudinal tensile strength of the random directional hydrogel. Conductivity of the directional hydrogel is 39 $S \cdot m^{-1}$, and an adhesion force of the directional hydrogel to the skin can reach 58 kPa.

Embodiment 5

Embodiment 5 is performed as follows.
(1) The dialdehyde cellulose aqueous solution is obtained according to the step of the Embodiment 1.
(2) An operation of step 2 in this embodiment is performed in accordance with the step 2 in Embodiment 1. The step 2 in this embodiment differs from the step 2 in Embodiment 1 in that the first mixture is reacted at 140° C.
(3) An operation of step 3 in this embodiment is performed in accordance with the step 3 in Embodiment 1. The step 3 in this embodiment differs from the step 3 in Embodiment 1 in that 0.03 g of the dopamine is added, and pH of the reaction solution is adjusted to 8.0.
(4) An operation of step 4 in this embodiment is performed in accordance with the step 4 in Embodiment 1. The step 4 in this embodiment differs from the step 4 in Embodiment 1 in that 20 mL of the mixture solution containing 3 mg of $FeCl_2 \cdot 4H_2O$ and 8 mg of $FeCl_3 \cdot 6H_2O$ is added into the dispersing solution and stirred for 3 hours under the $N_2$ atmosphere, and 0.1 mL of 28% $NH_3 \cdot H_2O$ is added into the second mixture and reacted for 3 hours at 90° C.
(5) An operation of step 5 in this embodiment is performed in accordance with the step 5 in Embodiment 1.

The longitudinal tensile strength of the directional hydrogel prepared under these conditions is about 0.15 MPa, 1.2 times the longitudinal tensile strength of the random directional hydrogel. Conductivity of the directional hydrogel is 35 $S \cdot m^{-1}$, and an adhesion force of the directional hydrogel to the skin can reach 57 kPa.

Embodiment 6

Embodiment 6 is performed as follows.
(1) The dialdehyde cellulose aqueous solution is obtained according to the step of the Embodiment 1.
(2) An operation of step 2 in this embodiment is performed in accordance with the step 2 in Embodiment 1. The step 2 in this embodiment differs from the step 2 in Embodiment 1 in that the first mixture is reacted under 0.2 g of the Ru/C catalyst.
(3) An operation of step 3 in this embodiment is performed in accordance with the step 3 in Embodiment 1. The step 3 in this embodiment differs from the step 3 in Embodiment 1 in that pH of the reaction solution is adjusted to 8.2.
(4) An operation of step 4 in this embodiment is performed in accordance with the step 4 in Embodiment 1. The step 4 in this embodiment differs from the step 4 in Embodiment 1 in that 20 mL of the mixture solution containing 3 mg of $FeCl_2 \cdot 4H_2O$ and 3 mg of $FeCl_3 \cdot 6H_2O$ is added into the dispersing solution and stirred for 3 hours under the $N_2$ atmosphere, and 0.1 mL of 28% $NH_3 \cdot H_2O$ is added into the second mixture and reacted for 5 hours at 80° C.
(5) An operation of step 5 in this embodiment is performed in accordance with the step 5 in Embodiment 1.

The longitudinal tensile strength of the directional hydrogel prepared under these conditions is about 0.14 MPa, 1.1 times the longitudinal tensile strength of the random directional hydrogel. Conductivity of the directional hydrogel is 31 $S \cdot m^{-1}$, and an adhesion force of the directional hydrogel to the skin can reach 47 kPa.

Embodiment 7

Embodiment 7 is performed as follows.
(1) The dialdehyde cellulose aqueous solution is obtained according to the step of the Embodiment 1.
(2) An operation of step 2 in this embodiment is performed in accordance with the step 2 in Embodiment 1.

(3) An operation of step 3 in this embodiment is performed in accordance with the step 3 in Embodiment 1. The step 3 in this embodiment differs from the step 3 in Embodiment 1 in that pH of the reaction solution is adjusted to 9.0.

(4) An operation of step 4 in this embodiment is performed in accordance with the step 4 in Embodiment 1. The step 4 in this embodiment differs from the step 4 in Embodiment 1 in that 20 mL of the mixture solution containing 3 mg of $FeCl_2 \cdot 4H_2O$ and 5 mg of $FeCl_3 \cdot 6H_2O$ is added into the dispersing solution and stirred for 3 hours under the $N_2$ atmosphere.

(5) An operation of step 5 in this embodiment is performed in accordance with the step 5 in Embodiment 1.

The longitudinal tensile strength of the directional hydrogel prepared under these conditions is about 0.24 MPa, 1.9 times the longitudinal tensile strength of the random directional hydrogel. Conductivity of the directional hydrogel is 48 S·m$^{-1}$, and an adhesion force of the directional hydrogel to the skin can reach 67 kPa.

Embodiment 8

Embodiment 8 is performed as follows.

(1) The dialdehyde cellulose aqueous solution is obtained according to the step of the Embodiment 1.

(2) An operation of step 2 in this embodiment is performed in accordance with the step 2 in Embodiment 1. The step 2 in this embodiment differs from the step 2 in Embodiment 1 in that the first mixture is reacted under 0.2 g of the Ru/C catalyst.

(3) An operation of step 3 in this embodiment is performed in accordance with the step 3 in Embodiment 1. The step 3 in this embodiment differs from the step 3 in Embodiment 1 in that 0.03 g of the dopamine is added, and pH of the reaction solution is adjusted to 8.0.

(4) An operation of step 4 in this embodiment is performed in accordance with the step 4 in Embodiment 1. The step 4 in this embodiment differs from the step 4 in Embodiment 1 in that 20 mL of the mixture solution containing 3 mg of $FeCl_2 \cdot 4H_2O$ and 3 mg of $FeCl_3 \cdot 6H_2O$ is added into the dispersing solution and stirred for 1 hour under the $N_2$ atmosphere.

(5) An operation of step 5 in this embodiment is performed in accordance with the step 5 in Embodiment 1.

The longitudinal tensile strength of the directional hydrogel prepared under these conditions is about 0.11 MPa, 0.9 times the longitudinal tensile strength of the random directional hydrogel. Conductivity of the directional hydrogel is 28 S·m$^{-1}$, and an adhesion force of the directional hydrogel to the skin can reach 41 kPa.

Performance Tests

Relevant performance tests are performed using Embodiment 1 as follows.

Figure 1:
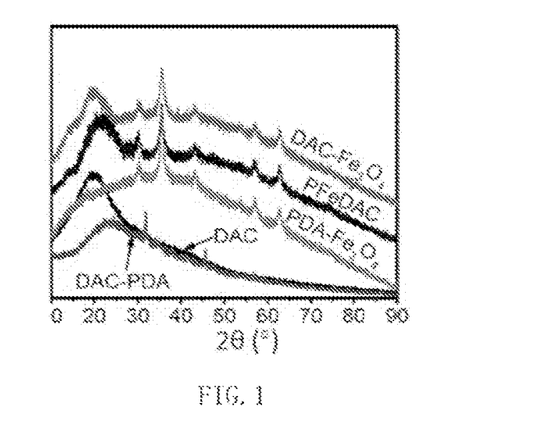
FIG. 1 illustrates X-ray diffraction (XRD) patterns of samples at various stages in Embodiment 1.

FIG. 1 illustrates X-ray diffraction (XRD) patterns of samples at various stages in Embodiment 1. According to an analysis of the XRD patterns, sharp peaks at 30.2° C., 35.5° C., 43.2° C., 57.1° C., and 62.8° C. have characteristics of a crystal structure of $Fe_3O_4$NPs, indicating that the crystal structure of $Fe_3O_4$NPs is formed on a surface of a PFeDAC sheet. Characteristics of peaks at around 20° C. are consistent with characteristics of DAC, identifying that PDA and the DAC play an important role for forming magnetic sheets. DAC is the dialdehyde cellulose obtained by sodium periodate (i.e., the $NaIO_4$) oxidation of the cellulose; DAC-PDA is a DAC complex modified by dopamine (PDA) grafting; the PFeDAC is magnetic cellulose-based two-dimensional nanosheets mediated by the PDA and the DAC (i.e., magnetic PFeDAC hybrid); DAC-$Fe_3O_4$ is magnetic hybrid mediated only by the DAC; and PAD-$Fe_3O_4$ is magnetic hybrid mediated only by the PDA.

Figure 2A:
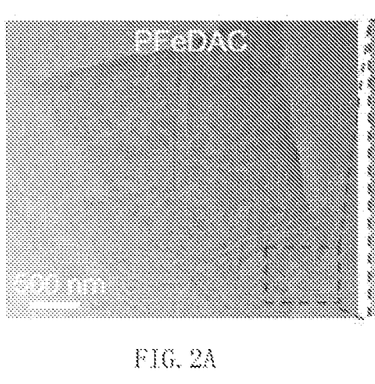
Figure 2B:
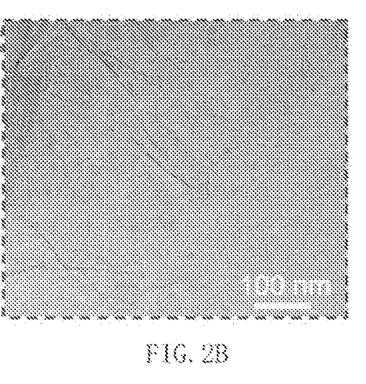
FIG. 2B illustrates $Fe_3O_4$ magnetic nanoparticles loaded on a sheet carrier.

FIGS. 2A and 2B illustrate transmission electron microscope (TEM) images of magnetic cellulose-based nanosheets obtained in Embodiment 1, and FIG. 2B illustrates $Fe_3O_4$ magnetic nanoparticles loaded on a sheet carrier.

Figure 3A:
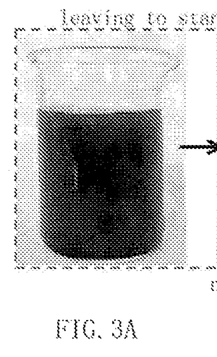
FIGS. 3A and 3B illustrate good stability of a magnetic PFeDAC nanosheet prepared in Embodiment 1 in water.
Figure 3B:
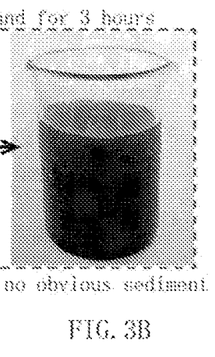
Figure 3C:
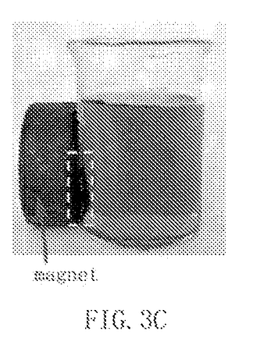
FIG. 3C illustrates good magnetism of the magnetic PFeDAC nanosheet in water.

FIGS. 3A, 3B, and 3C illustrate existing states of magnetic PFeDAC nanosheets prepared in Embodiment 1 in water. The magnetic PFeDAC nanosheets prepared in Embodiment 1 have no obvious sediment after being left to stand in water for 3 hours, indicating that the magnetic PFeDAC nanosheets have good stability (see FIGS. 3A and 3B). When a magnet moves close to the magnetic PFeDAC nanosheets, the $Fe_3O_4$ magnetic nanoparticles are obviously attracted by the magnet, indicating that the $Fe_3O_4$ magnetic nanoparticles have good magnetism (see FIG. 3C).

Figure 5A:
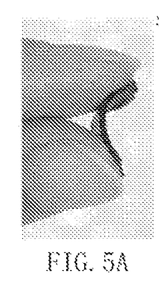
FIGS. 5A, 5B, and 5C illustrate adhesion and tensile results of the hydrogel prepared in Embodiment 1, and a content of magnetic PFeDAC hybrid in the various hydrogels is 8 wt %.
Figure 5B:
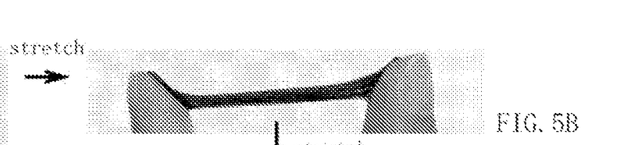
Figure 5C:
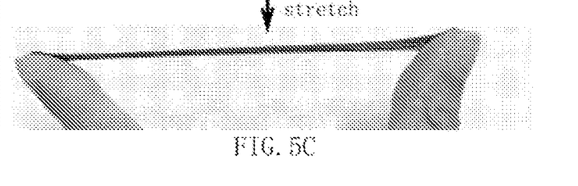

Adhesion and tensile tests of the various hydrogels prepared in Embodiment 1 are performed using conventional methods. The various hydrogels can be adhered to the skin and has good tensile properties (the adhesion and tensile results of the various hydrogels are shown in FIGS. 5A, 5B, and 5C). A content of the magnetic PFeDAC hybrid used in various hydrogels is 8 wt %.

Figure 6:
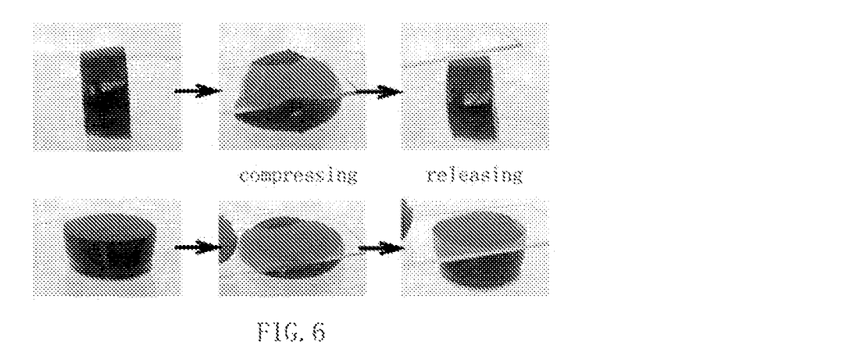
FIG. 6 illustrates a compression experiment of the hydrogel prepared in Embodiment 1, and the content of the magnetic PFeDAC hybrid in the various hydrogels is 8 wt %.

The compression experiment of the various hydrogels prepared in Embodiment 1 is performed using conventional methods. When a preset press is applied to the various hydrogels, the various hydrogels are obviously deformed. When the preset press is released, the various hydrogels reset to an original form of the hydrogel, indicating that the various hydrogels have good compression resistance (results are shown in FIG. 6). The content of the PFeDAC magnetic hybrid used in the various hydrogels is 8 wt %.

Figure 7A:
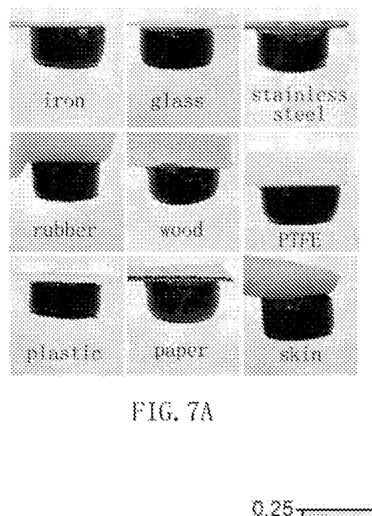
FIGS. 7A and 7B illustrate good adhesion properties of the hydrogel prepared in Embodiment 1 relative to various substrates as follows: iron sheet (56 kPa), glass (48 kPa), stainless steel (53 kPa), rubber (31 kPa), wood (13 kPa), polytetrafluoroethylene (PTFE) (39 kPa), plastic (17 kPa), paper (11 kPa), and skin (63 kPa). The content of the magnetic PFeDAC hybrid in the various hydrogels is 8 wt %.
Figure 7B:
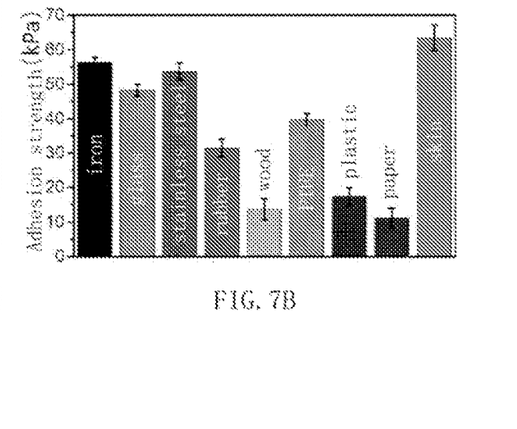

Adhesion properties of the various hydrogels prepared in Embodiment 1 are performed using conventional methods. FIGS. 7A and 7B illustrate good adhesion properties of the various hydrogels prepared in Embodiment 1 relative to various substrates as follows: iron sheet (56 kPa), glass (48 kPa), stainless steel (53 kPa), rubber (31 kPa), wood (13 kPa), polytetrafluoroethylene (PTFE) (39 kPa), plastic (17 kPa), paper (11 kPa), and skin (63 kPa). The content of the magnetic PFeDAC hybrid in the various hydrogels is 8 wt %.

Figure 8:
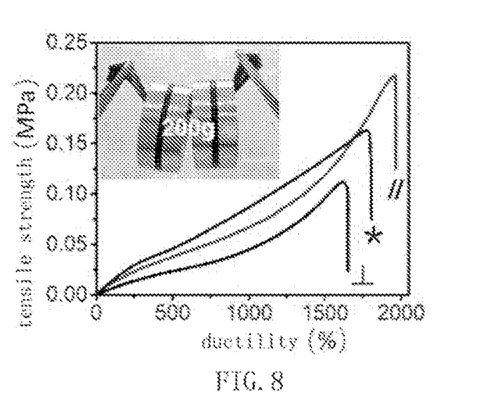
FIG. 8 illustrates tensile stress-strain curves of three hydrogels prepared in Embodiment 1 under forces in different directions, the three hydrogels are as follows: (*) represents a first hydrogel prepared under no external magnetic field, the first hydrogel is isotropic and has a same force in all directions; (//) represents a second hydrogel prepared under an applied force parallel to a magnetic field direction; (⊥) represents a third hydrogel prepared under the applied force perpendicular to the magnetic field direction. The content of the magnetic PFeDAC hybrid in the various hydrogels is 8 wt %.

Tensile performance tests of the various hydrogels prepared in Embodiment 1 are performed using conventional methods. FIG. 8 illustrates tensile stress-strain curves of three hydrogels prepared in Embodiment 1 under forces in different directions, the three hydrogels are as follows: (*) represents a first hydrogel prepared under no external magnetic field, the first hydrogel is isotropic and has a same force in all directions; (//) represents a second hydrogel prepared under an applied force parallel to a magnetic field direction; (⊥) represents a third hydrogel prepared under the applied force perpendicular to the magnetic field direction. The content of the magnetic PFeDAC hybrid in the various hydrogels is 8 wt %.

Figure 9:
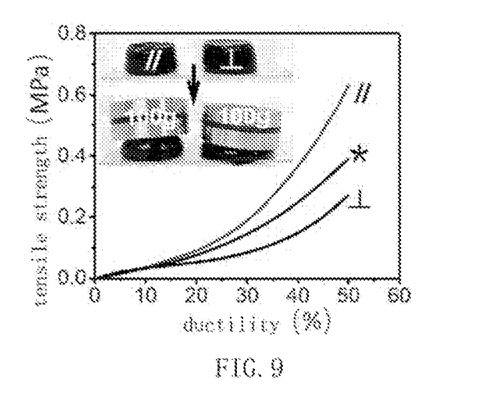
FIG. 9 illustrates compressive stress-strain curves of the three hydrogels prepared in Embodiment 1 under the forces in the different directions, the three hydrogels are as follows: (*) represents the first hydrogel prepared under no external magnetic field, the first hydrogel is isotropic and has a same force in all directions; (//) represents the second hydrogel prepared under an applied force parallel to the magnetic field direction; (⊥) represents the third hydrogel prepared under the applied force perpendicular to the magnetic field direction. The content of the magnetic PFeDAC hybrid in the various hydrogels is 8 wt %.

Tensile strain tests of the various hydrogels prepared in Embodiment 1 are performed by conventional methods. FIG. 9 illustrates compressive stress-strain curves of the three hydrogels prepared in Embodiment 1 under the forces in the different directions, the three hydrogels is as follows: (*) represents the first hydrogel prepared under no external magnetic field, the first hydrogel is isotropic and has a same force in all directions; (//) represents the second hydrogel prepared under an applied force parallel to the magnetic field direction; (⊥) represents the third hydrogel prepared under the applied force perpendicular to the magnetic field direction. The content of the magnetic PFeDAC hybrid in the various hydrogels is 8 wt %.

Figure 10:
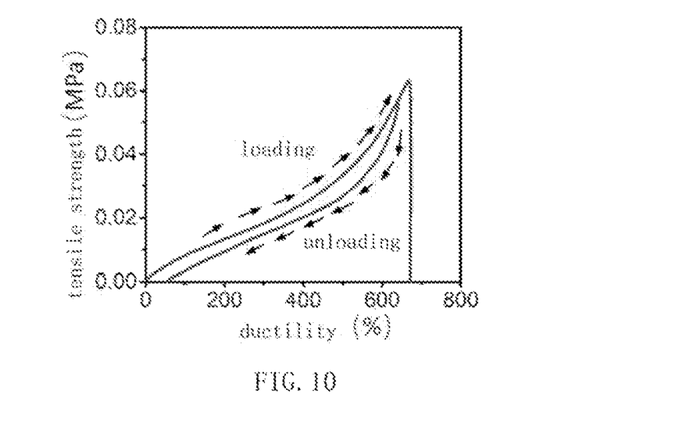
FIG. 10 illustrates the tensile stress-strain curves of the second hydrogel prepared in Embodiment 1 during a loading-unloading cycle, the applied force is parallel to the magnetic field direction, and the content of the magnetic PFeDAC hybrid in the second hydrogel is 8 wt %.

Loading-unloading tests of the second hydrogel prepared in Embodiment 1 are performed by conventional methods. FIG. 10 illustrates the tensile stress-strain curves of the second hydrogel prepared in Embodiment 1 during a loading-unloading cycle, the applied force is parallel to the magnetic field direction, and the content of the magnetic PFeDAC hybrid in the various hydrogels is 8 wt %. Referring to FIG. 10, no significant hysteresis is observed on a loading-unloading cyclic curve of the second hydrogel having 8 wt % of the magnetic PFeDAC hybrid when a constant force for 700% deformation is applied to the second hydrogel.

Figure 11:
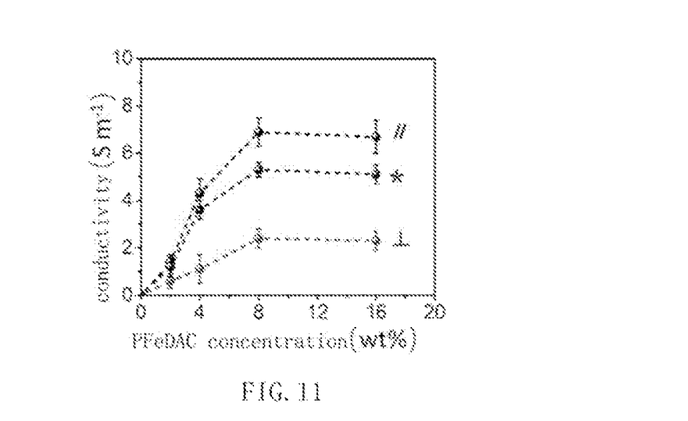
FIG. 11 illustrates electric conductivity of the three hydrogels prepared in Embodiment 1 with different concentrations of PFeDAC under the applied force parallel to the magnetic field direction.

Conductivity tests of the various hydrogels prepared in Embodiment 1 are tested by conventional methods. FIG. 11 illustrates electric conductivity of the various hydrogels prepared in Embodiment 1 with different concentrations of the magnetic PFeDAC hybrid under the applied force parallel to the magnetic field direction. Results of the conductivity tests are as follows: with respect to the first hydrogel with 8 wt % of the magnetic PFeDAC hybrid prepared under no external magnetic field (*), the second hydrogel with 8 wt % of the magnetic PFeDAC hybrid prepared under the applied force parallel to the magnetic field direction (//), and the third hydrogel with 8 wt % of the magnetic PFeDAC hybrid prepared under the applied force perpendicular to the magnetic field direction (⊥), a conductivity of the hydrogel increases with an increase of the content of the magnetic PFeDAC hybrid. The conductivity of the hydrogel stabilizes or even decreases slightly following with increasing of a concentration of the magnetic PFeDAC hybrid.

What is claimed is:

1. A method for preparing anisotropic cellulose-based hydrogel, comprising
   (1) obtaining dialdehyde cellulose by oxidizing cellulose using sodium periodate;
   (2) ammoniating the dialdehyde cellulose to obtain ammoniated cellulose derivatives;
   (3) performing Schiff reaction using the ammoniated cellulose derivatives and dopamine to obtain cellulose-dopamine nanosheets;
   (4) depositing $Fe_3O_4$ nanopartides on a surface of the cellulose-dopamine nanosheets by a deposition method to obtain magnetic cellulose-dopamine nanosheets; and
   (5) forming the anisotropic cellulose-based hydrogel using the magnetic cellulose-dopamine nanosheets by a polymerization method.

2. The method according to claim 1, wherein:
   step (1) comprises:
      mixing the cellulose and the sodium periodate in a water system, stirring while preventing light exposure, then washing in deionized water, and freeze-drying to obtain the dialdehyde cellulose; and
      heating the dialdehyde cellulose to dissolve the dialdehyde cellulose in water to obtain a dialdehyde cellulose aqueous solution.

3. The method according to claim 1, wherein:
   step (2) comprises:
      mixing the dialdehyde cellulose obtained in step (1) with $NH_3H_2O$ and methanol, reacting in a reaction kettle while heating under catalyst and $H_2$ pressure to obtain the ammoniated cellulose derivatives, wherein the catalyst is selected from at least one of an iron-based catalyst, a cobalt-based catalyst, a nickel-based catalyst, an Ru/C catalyst, or a Pd/C catalyst.

4. The method according to claim 3, wherein, in step (2), the $H_2$ pressure is more than 2.0 MPa, a temperature for the reacting is 100-150° C., and a time for the reacting is more than 2 hours.

5. The method according to claim 1, wherein:
   the performing Schiff reaction using the ammoniated cellulose derivatives and dopamine to obtain cellulose-dopamine nanosheets in step (3) comprises:
      adding the ammoniated cellulose derivatives obtained in step (2) to a mixture of methanol and water, stirring, then adding the dopamine, and reacting to obtain a reaction solution; and
      adjusting pH of the reaction solution to be alkaline, further reacting, centrifuging, and drying to obtain the cellulose-dopamine nanosheets.

6. The method according to claim 1, wherein:
   step (4) comprises:
      dispersing the cellulose-dopamine nanosheets obtained in step (3) into a mixture of water and methanol, stirring, then adding a mixture solution containing $FeCl_2.4H_2O$ and $FeCl_3.6H_2O$, stirring under $N_2$ atmosphere, then adding $NH_3.H_2O$, reacting while heating centrifuging, and washing to obtain the magnetic cellulose-dopamine nanosheets.

7. The method according to claim 1, wherein:
   step (4) comprises:
      dispersing 10 mg of the cellulose-dopamine nanosheets obtained in step (3) into 30 mL of a mixture of water and methanol, stirring for 30 minutes, then adding 20 mL of a mixture solution containing 3 mg of $FeCl_2.4H_2O$ and 8 mg of $FeCl_3.6H_2O$, stirring for 1 hour under $N_2$ atmosphere, then adding 0.1 mL of 28% $NH_3.H_2O$, reacting while heating, and repeatedly centrifuging and washing to obtain the magnetic cellulose-dopamine nanosheets coated with the $Fe_3O_4$ nanoparticles, wherein a volume/volume (v/v) ratio of the water and the methanol is 2:1.

8. The method according to claim 1, wherein:
   step (5) comprises:
      mixing tetramethylethylenediamine, acrylamide or acrylic acid, initiator, N, N-methylene diacrylamide, and the magnetic cellulose-dopamine nanosheets obtained in step (4), stirring, pouring into a mold, and performing polymerization to obtain the anisotropic cellulose-based hydrogel.

9. The method according to claim 8, wherein:
   the initiator is ammonium persulfate or potassium persulfate.

10. The method according to claim 8, wherein:
   step (5) comprises:
      letting the mold stand at 60-70° C. for 1-3 hours.

11. The method according to claim 3, wherein, in step (2), the $H_2$ pressure is 2.0-3.0 MPa, a temperature for the reacting is 120° C., and a time for the reacting is 3-5 hours.

12. The method according to claim 5, wherein:
   a volume/volume (v/v) ratio of the methanol and the water is 1:4, and
   the adjusting pH of the reaction solution to be alkaline comprises adjusting pH of the reaction solution to be 8.0-9.0.

13. The method according to claim 6, wherein:
- a weight/volume ratio of the cellulose-dopamine nanosheets and the mixture of the water and the methanol is 1 mg: 2-4 mL,
- a volume/volume (v/v) ratio of the water and the methanol of the mixture is 1-3:1,
- a weight ratio of the $FeCl_2.4H_2O$ and $FeCl_3.6H_2O$ in the mixture solution is 3:5-12,
- the $NH_3.H_2O$ is 28% $NH_3.H_2O$,
- a temperature for the reacting while heating is 80-100° C., and
- a time for the reacting while heating is 1-5 hours.

* * * * *